(12) United States Patent
Ruan

(10) Patent No.: US 8,432,290 B2
(45) Date of Patent: Apr. 30, 2013

(54) FORCE MEASURING RATCHET TIE DOWN

(75) Inventor: Buqin Ruan, Zhugang Town (CN)

(73) Assignee: Zhejiang Topsun Logistic Control Co., Ltd., Taizhou (CN)

( * ) Notice: Subject to any disclaimer, the term of this patent is extended or adjusted under 35 U.S.C. 154(b) by 792 days.

(21) Appl. No.: 12/581,508

(22) Filed: Oct. 19, 2009

(65) Prior Publication Data

US 2011/0001627 A1 Jan. 6, 2011

(30) Foreign Application Priority Data

Jul. 6, 2009 (CN) .......................... 2009 1 0158317

(51) Int. Cl.
G08B 21/00 (2006.01)

(52) U.S. Cl.
USPC ... 340/668; 340/665; 73/862.474; 73/862.42; 410/103; 410/100

(58) Field of Classification Search .................. 340/665, 340/668, 678; 73/862.474, 862.42; 410/103, 410/100
See application file for complete search history.

(56) References Cited

U.S. PATENT DOCUMENTS

| | | | | |
|---|---|---|---|---|
| 7,857,560 | B2 * | 12/2010 | Leggett et al. ................ | 410/103 |
| 7,972,099 | B2 * | 7/2011 | Leggett et al. ................ | 410/103 |
| 2007/0269285 | A1 * | 11/2007 | Leggett ......................... | 410/100 |
| 2008/0304932 | A1 * | 12/2008 | Leggett et al. ................ | 410/100 |

FOREIGN PATENT DOCUMENTS

CN 200610028900.2 1/2007

* cited by examiner

*Primary Examiner* — Daryl Pope
(74) *Attorney, Agent, or Firm* — Minder Law Group; Willy H. Wong

(57) ABSTRACT

The present invention provides a force measuring ratchet tie down in the field of goods holding. The force measuring ratchet tie down of the invention addresses the technical problems such has insufficiently tight binding, severe difficulty in control and trouble in adjustment. The force measuring ratchet tie down includes a body assembly, a handle, a teeth stop board, a catch and a scroll. The handle is connected with the body assembly through the scroll. A binding belt having a fixable outer end is connected to the body assembly. Another binding belt having a fixable outer end is rolled on the scroll. A ratchet is fixed on the scroll. The body assembly is movably connected with a teeth stop board the end of which could be embedded among the teeth of the ratchet. The handle is movably connected with a catch the end of which could be embedded among the teeth of the ratchet. A sensor is placed at a forced part of the tie down, which is linked with a signal processing circuit and could generate a signal corresponding to the size of the tensioning force of the binding belt when the tie down is in operation. A display device is connected to the signal processing circuit. The force measuring ratchet tie down of the invention has advantages including a high safety property, a compact structure and a low manufacturing cost.

20 Claims, 7 Drawing Sheets

US 8,432,290 B2

FORCE MEASURING RATCHET TIE DOWN

BACKGROUND OF THE INVENTION

1. Field of Invention

The present invention relates to a device for holding goods in logistics transportation, in particular, to a force measuring ratchet tie down.

2. Related Art

Goods usually need be fixed during transportation by vehicles to make the delivery safe and reliable. It is not only of low efficiency but also laborious to bind the goods with conventional nylon ropes or wire ropes. Also, the goods could hardly be bound tight. The goods could be bound and positioned expediently by using a tie down which is widely used nowadays and very popular amongst the workers in the field of logistics transportation.

The tie down currently used for logistics transportation includes a body, a handle, a ratchet, a scroll, a catch, a teeth stop board, a mesh belt, a belt hook and a spring. The tie down has a two belt hooks, in particular, a positioning belt hook and a mobile belt hook. The positioning belt hook is fixedly connected with the outer end of the positioning belt. The inner end of the positioning belt is fixedly connected to the body. The mobile belt hook is fixedly connected with the outer end of the mobile belt. The inner end of the mobile belt is rolled on the scroll. The mobile belt could be elongated or shortened for binding as the scroll rotates. In particular, the roll of the mobile belt is accomplished as follows. The handle is pulled and the lateral plate of the handle could be brought to rotate around the scroll. The catch on the lateral plate makes the ratchet rotate in a single way, so that the mobile belt could be rolled gradually because the ratchet is fixedly connected to the scroll. The extension of the mobile belt could be acquired in the following. The hand is pulled to detach from the ratchet. The mobile belt brings the scroll to rotate in a reverse direction by tension, so that the mobile belt is rapidly loosened.

For example, Chinese Patent Application No. 200610028900.2 discloses a tie down of an adjustable belt loosening speed, which has a body and a handle. A positioning belt is fixed at the end of the body. A positioning belt hook is placed at the outer end of the positioning belt. The side plate of the body is hinged to the side plate of the handle via a scroll. Each one of both ends of the scroll has a ratchet covered thereon. A mobile belt is rolled on the scroll. A mobile belt hook is positioned at the outer end of the mobile belt. The body is movably connected with a teeth stop board which could be matched with the ratchet. The handle is movably connected with a catch which could be matched with the ratchet. A dent matched with the ratchet is provided on the side plate of the body. An inclined face is set on the side plate of the handle. When the end of the catch is placed within the dent, the teeth stop board is positioned at the upper part of the inclined face to detach the teeth stop bard from the teeth of the ratchet.

However, the condition of the tensioning force of the binding belt could not be understood during use of the tie down. Thus, it is difficult to control the tie down, causing the goods to be damaged or the binding belt to be broken for the goods are bound over-tight. Or, the transportation of goods is adversely affected for they are not bound sufficiently tight. Furthermore, the forces used to bind different kinds of goods or same goods at different positions are different when the goods are to be bound, which aggravates the difficulty in control. On the other hand, the tensioning force of the binding belt of the tie down could be varied due to dumping or shaking during transportation. In this case, the tensioning force of the binding belt is over-large at some sites and too small at some other sites. Therefore, it is required to adjust the tensioning force, which could not be achieved by the current tie downs because the tensioning force of the binding belt could not be understood and thus difficult to be conditioned.

SUMMARY OF THE INVENTION

The present invention provides a force measuring ratchet tie down to address the above-mentioned problems, which could acquire the size of the tensioning force of the tie down in time, and has a high safety property, a compact structure and a low manufacturing cost.

To achieve the purpose, the present invention provides a force measuring ratchet tie down having a body assembly, a handle, a teeth stop board, a catch and a scroll. The handle is connected with the body assembly through the scroll. A binding belt having a fixable outer end is connected to the body assembly. Another binding belt having a fixable outer end is rolled on the scroll. A ratchet is fixed on the scroll. The body assembly is movably connected with a teeth stop board the end of which could be embedded among the teeth of the ratchet. The handle is movably connected with a catch the end of which could be embedded among the teeth of the ratchet. A sensor is placed at a forced part of the tie down, which is linked with a signal processing circuit and could generate a signal corresponding to the size of the tensioning force of the binding belt when the tie down is in operation. A display device is connected to the signal processing circuit.

The manufacturing cost could be largely reduced due to the fact that the sensor is directly provided at the forced part of the tie down by making full use of the configuration of the existing tie down without modifying the configuration to a large extent. The size of the tensioning force of the tie down could be conveniently detected by using the sensor. The detected signal could be transmitted to the signal processing circuit which could display the processed value of the tensioning force visually on the display device. In this connection, the operator could expediently and timely control the size of the tensioning force of the tie down, thereby improving the expediency and safety of the tie down in use.

The tensioning force of the binding belt of the tie down need be adjusted for bumping or shaking during transportation. In this case, the tensioning force could be conveniently understood by observing the display device to determine whether it is over-large or insufficient, and thus the tensioning force of the binding belt could be adjusted to guarantee the safety of transportation.

According to the force measuring ratchet tie down of the invention, the body assembly has two parallel bodies and a transverse axle. The scroll is positioned through the bodies at one end, and the transverse axle is fixed at the other end of the bodies. An axle cover is set on the transverse axle, to which the binding belt having a fixable outer end is linked. The sensor is kept on the body or transverse axle or axle cover.

The forces exerted on the bodies, transverse axle and axle cover are corresponding to that on the binding belt, so that the size of the tensioning force of the binding belt could be conveniently obtained by detecting the force on any one of the aforementioned parts.

According to the force measuring ratchet tie down of the invention, the sensor is a resistance strain gauge. The sensor is fixed on the body. A casing is held on said two bodies outside the sensor. The signal processing circuit is set within the casing.

In accordance with the working principle of the resistance strain gauge sensor, an elastic body is flexibly deformed under external force to distort the resistance strain gauge attached to the surface of the elastic body. The value of resistance of the resistance strain gauge would increase or decrease once it is deformed. Such a variance in resistance could be converted into an electric signal voltage or current via a relevant measuring circuit. Therefore, the external force could be converted into an electric signal. In combination with said invention, the forced part is so slightly deformed under the tensioning force that the resistance strain gauge on the forced part is deformed correspondingly, and an electric signal corresponding to the size of the tensioning force is generated. The casing herein could protect the sensor and facilitate installation of the signal processing circuit.

The bodies take a relatively large size in the complete tie down, which contributes to mounting parts such as the sensor. Moreover, a relatively large mount space is provided between said two bodies to improve the spatial utilization rate efficiently, in which case a compact structure is generated.

According to the force measuring ratchet tie down of the invention, the body has a groove on the outer wall, in which the sensor is secured.

The groove is provided to make the deformation of the body more conveniently and precisely perceived by the sensor, in which situation the operation precision and sensitivity of the sensor are enhanced.

According to the force measuring ratchet tie down of the invention, the display device comprises a display connected with the signal processing circuit, which is fixed to the casing.

The operator could acquire the size of the tensioning force in a much convenient way in the operation of the tie down because the display is directly fixed on the casing.

According to the force measuring ratchet tie down of the invention, the display device further includes a wireless signal transmission module for transmitting a wireless signal and an exterior receiving means for receiving said wireless signal connected to the signal processing circuit.

The signal of size of the tensioning force could be transmitted to the exterior receiving means by the wireless signal transmission module, in which case a remote monitoring is accomplished. This way, the operation condition of one or more tie downs could be obtained. Furthermore, it could be discovered in time whether the tensioning force of the tie down is changing or not during transportation.

According to the force measuring ratchet tie down of the invention, the signal processing circuit includes a circuit board which could receive and process the signal corresponding to the size of the tensioning force of the binding belt and a built-in power supply connected with the circuit board for supplying power to the entire signal processing circuit, which is implemented to be a storage cell. The cell could be conveniently recharged when it runs out of power, and thus the use cost is reduced.

According to the force measuring ratchet tie down of the invention, the circuit board is linked with a configuration means to set the threshold of the tensioning force and a warning means to send a warning signal when the tensioning force exceeds the set threshold.

The operator could be noticed and the warning threshold of the tensioning force could be independently set as required by using the above-described structure. The warning means herein could be implemented by sound, light or the combination thereof.

According to the force measuring ratchet tie down of the invention, the casing includes a seat having a mounting groove and a panel covering on the mounting groove. A display opening is provided on the panel, in which the display is held. The panel is fixed on the seat by a press frame.

According to the force measuring ratchet tie down of the invention, the seat is made of plastic and secured on the bodies by injection molding.

The force measuring ratchet tie down has the advantages as follows over the prior art. Firstly, the size of the tensioning force of the tie down could be detected in real time through the sensor, so that the operation condition of the tie down could be timely understood by the operator for further processing. Also, it could be visually determined whether the tensioning force is changing or not. Secondly, the device of the invention could be operated and used in a rather convenient way, in which case the safety and reliability in goods binding are efficiently improved. Last but not least, the parts of the tie down are made full use of, and the configuration of the tie down need not be modified to a large extent, producing a compact structure and a low cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

First Embodiment

Figure 1:
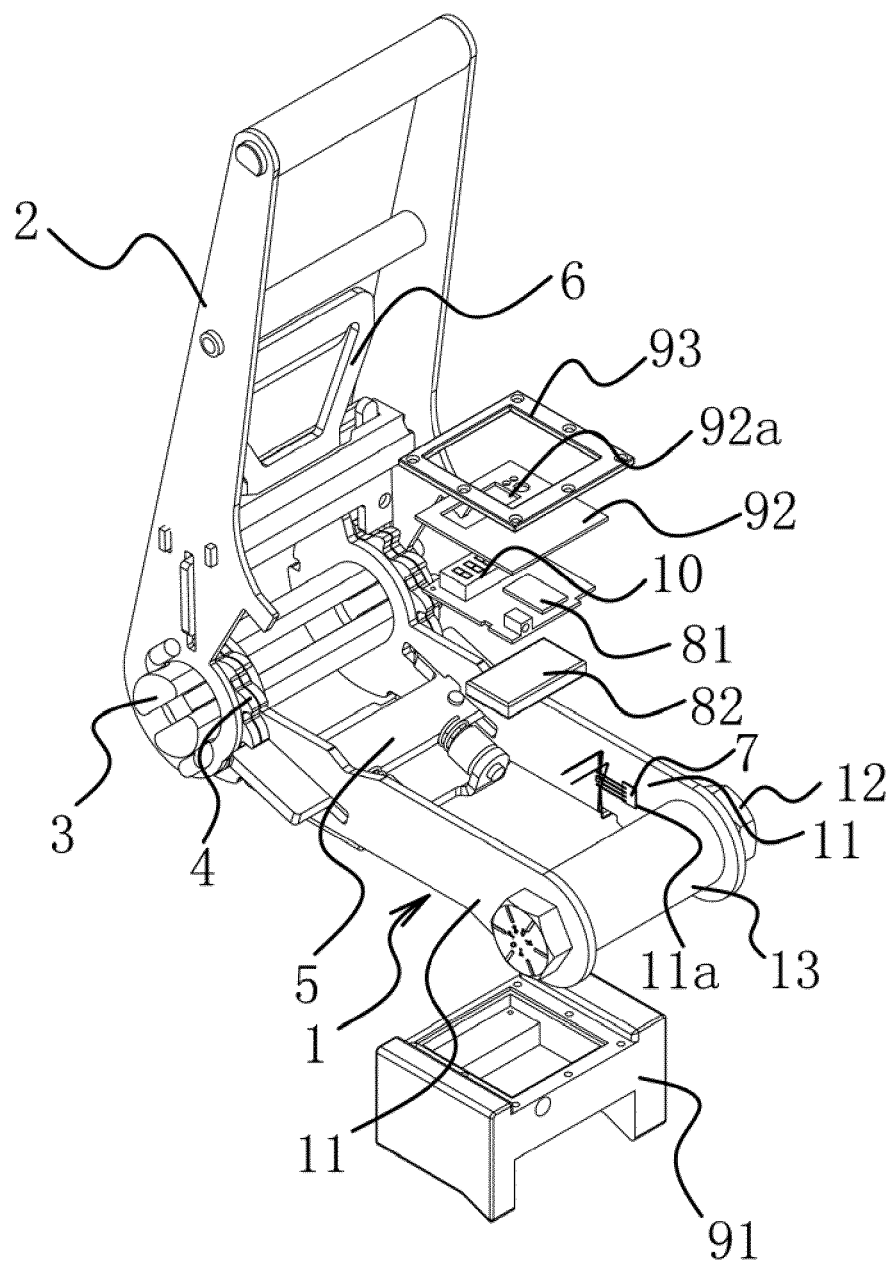
FIG. 1 is an exploded view of a force measuring ratchet tie down of the invention.
Figure 2:
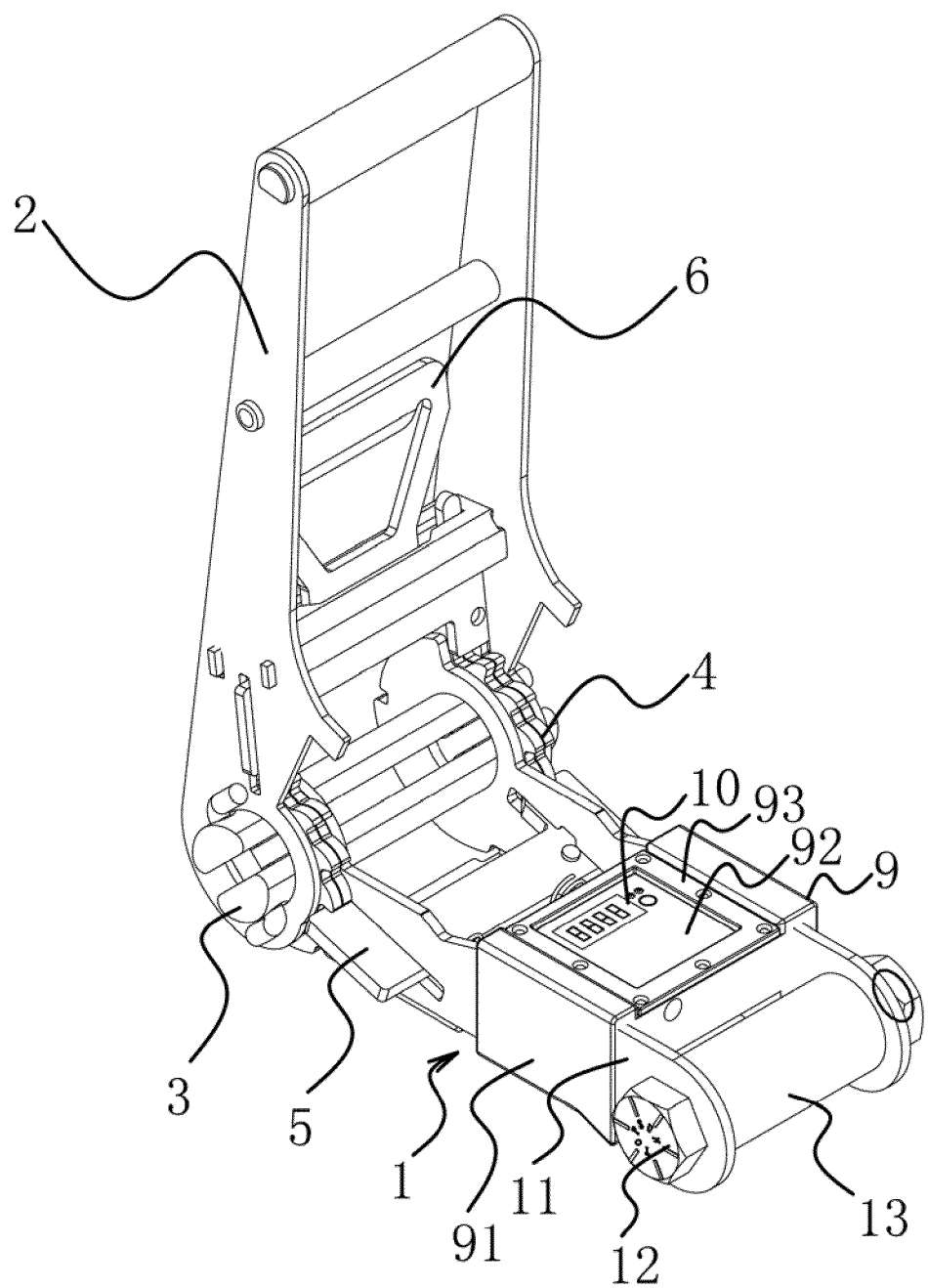
FIG. 2 is a stereogram of the device of the invention.
Figure 3:
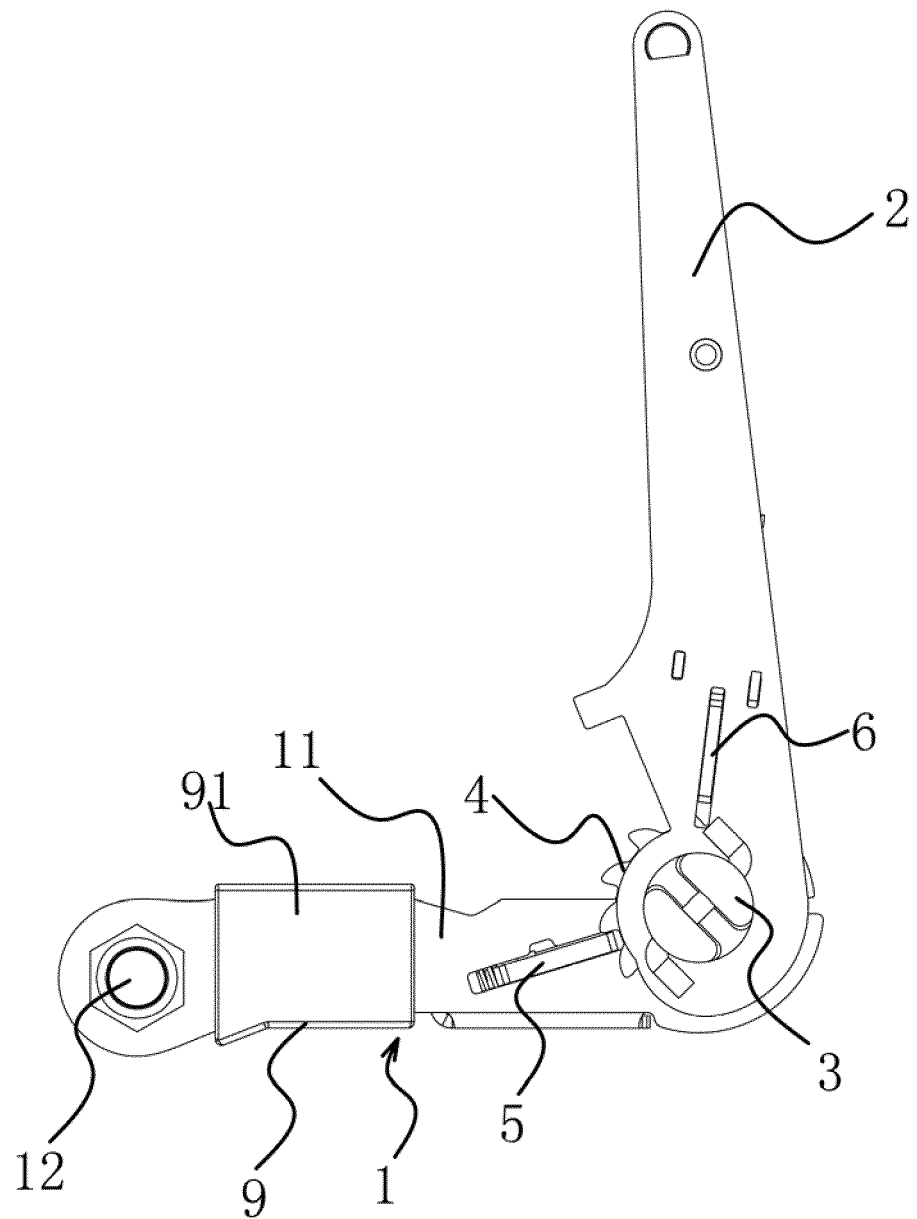
FIG. 3 is a front view of the device of the invention.
Figure 4:
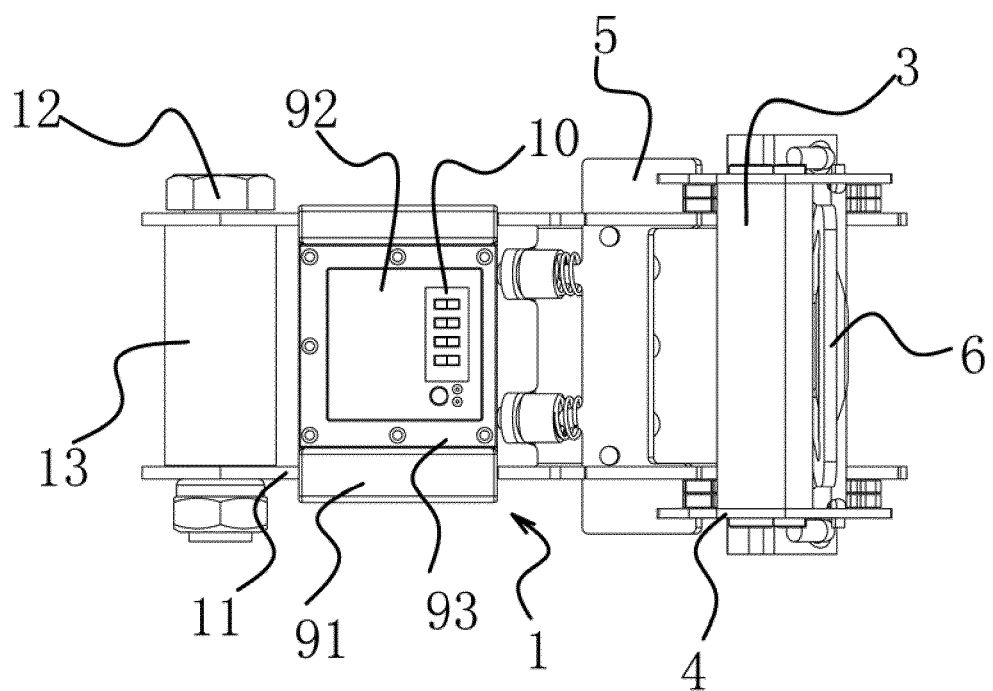
FIG. 4 is a top view of the device of the invention.
Figure 5:
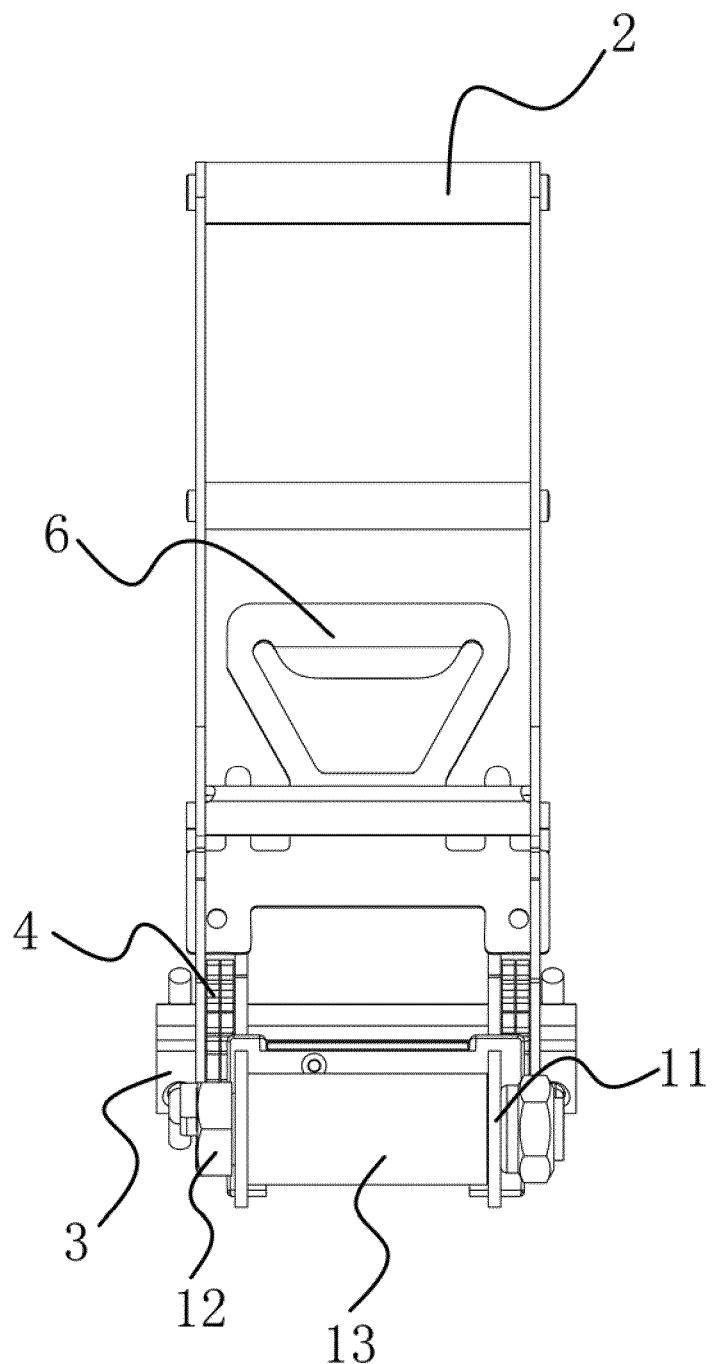
FIG. 5 is a side view of the device of the invention.

As shown in FIGS. 1-6, the force measuring ratchet tie down of the invention includes a body assembly 1, a handle 2 and a scroll 3. The handle 2 is connected with the body assembly 1 through the scroll 3. A binding belt having a positioning belt hook at the outer end is connected to the body assembly 1. Another binding belt having a positioning belt hook at the outer end is rolled on the scroll 3. A ratchet 4 is fixed on the scroll 3. The body assembly 1 is movably connected with a teeth stop board 5 the end of which could be embedded among the teeth of the ratchet 4. The handle 2 is movably connected with a catch 6 the end of which could be embedded among the teeth of the ratchet 4.

In FIGS. 1-5, the body assembly 1 has two parallel bodies 11 and a transverse axle 12. The scroll 3 is positioned through the bodies 11 at one end, and the transverse axle 12 is fixed at the other end of the bodies 11. An axle cover 13 is set on the transverse axle 12, to which the binding belt having a positioning belt hook at the outer end is linked.

Figure 6:
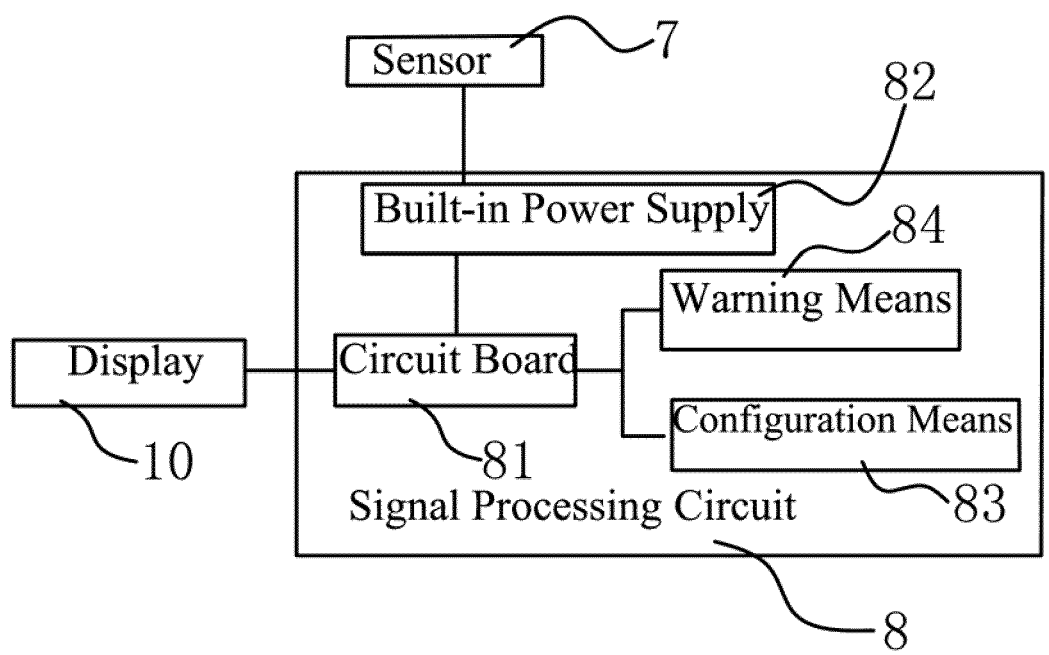
FIG. 6 is a block diagram of the electric structure of the first embodiment of the invention.

A sensor 7 is placed at a forced part of the tie down, which is linked with a signal processing circuit 8 and could generate a signal corresponding to the size of the tensioning force of the binding belt when the tie down is in operation. The forced part is implemented as the body 11, transverse axle 12 or axle cover 13, on which the sensor 7 is fixed. In this embodiment, the sensor 7 is fixed on the body 11. In particular, the body 11 has a groove 11a on the outer wall, in which the sensor 7 is secured. A casing 9 is held on said two bodies 11 outside the sensor 7. As shown in FIGS. 1 and 6, the sensor 7 is a resistance strain gauge. The signal processing circuit 8 is set within the casing 9. A display device is connected to the signal processing circuit 8.

The display device comprises a display 10 connected with the signal processing circuit 8, which is fixed to the casing 9. The casing 9 includes a seat 91 having a mounting groove and a panel 92 covering on the mounting groove. A display opening 92a is provided on the panel 92, in which the display 10 is held. The panel 92 is fixed on the seat 91 by a press frame 93. The seat 91 is made of plastics and secured on the bodies 11 by injection molding.

As shown in FIG. 6, the signal processing circuit 8 includes a circuit board 81 which could receive and process the signal corresponding to the size of the tensioning force of the binding belt and a built-in power supply 82 connected with the circuit board 81 for supplying power to the entire signal processing circuit 8, which is implemented to be a storage cell. The circuit board 8 is linked with a configuration means 83 to set the threshold of the tensioning force and a warning means 84 to send a warning signal when the tensioning force exceeds the set threshold.

During the tightening process of the binding belt in the tie down, the sensor 7 could collect the tensioning force signal of the binding belt in real time and transmit said signal to the signal processing circuit 8. The signal could be presented on the display 10 after being processed by the signal processing circuit 8. The signal processing includes signal magnification and analog-to-digital conversion. The operator could clearly understand the size of the tensioning force of the binding belt by the display 10, to make the use of the tie down safer and more convenient. The tensioning force could be conveniently understood to be over-large or insufficient via observation of the display 1 during transportation, so that the tensioning force of the binding belt could be conditioned to guarantee the security of transportation.

Second Embodiment

Figure 7:
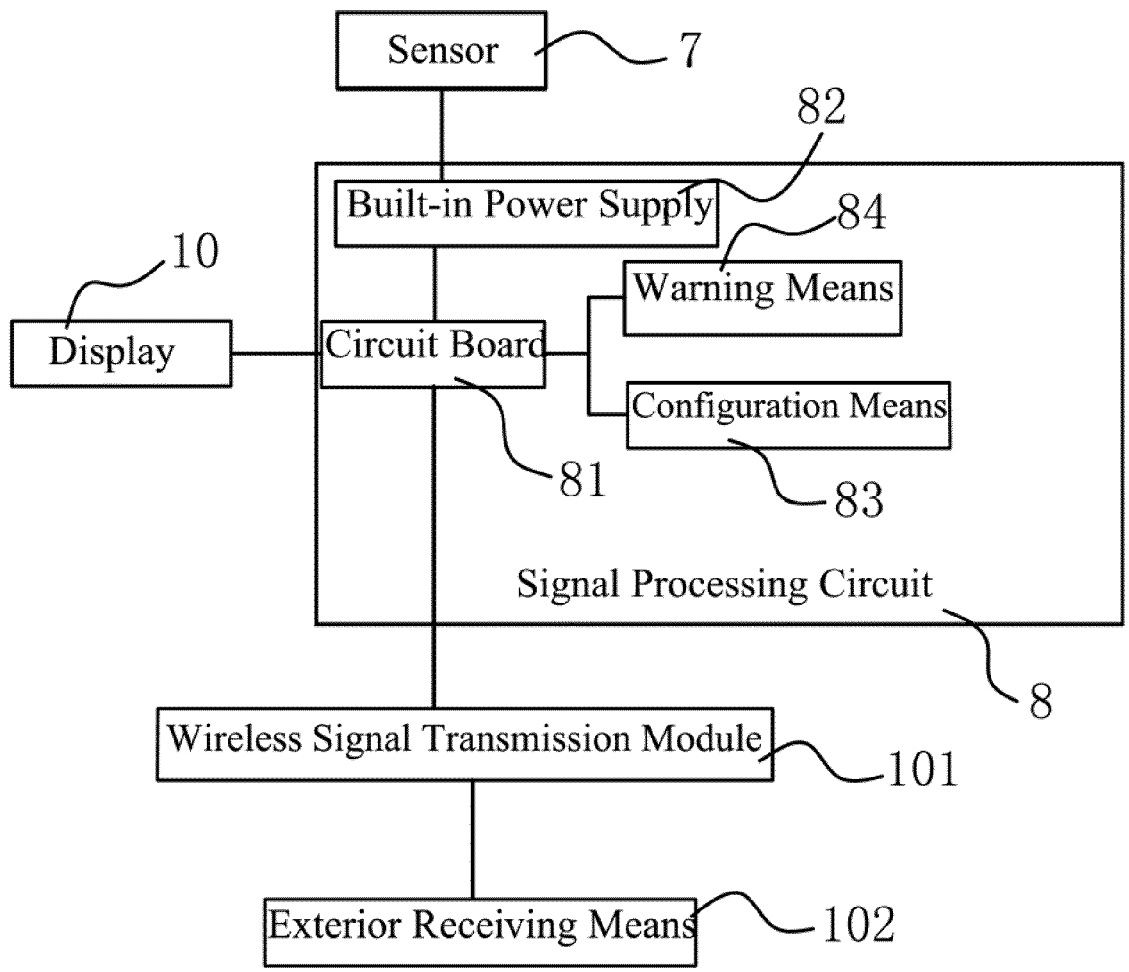
FIG. 7 is a block diagram of the electric structure of the second embodiment of the invention.

As shown in FIG. 7, compared with the first embodiment, the signal processing circuit 8 is further connected with a wireless signal transmission module 101 to transmit a wireless signal and an exterior receiving means 102 to receive said wireless signal. The signal of size of the tensioning force could be transmitted to the exterior receiving means 102 by the wireless signal transmission module 101. The exterior receiving means 102 could monitor the operation condition of the load binder in real time. A multiple of load binders could be monitored simultaneously due to the exterior receiving means 102.

The remaining features of the second embodiment are similar to those of the first embodiment. In particular, the operation procedure of the sensor 7 and other parts is also substantially identical in the said two embodiments. Therefore, the description thereof is omitted here for brevity.

The invention being thus described, it will be obvious that the same may be varied in several ways. Such variations are not to be regarded as a departure from the spirit and scope of the invention, and all such modifications as would be obvious to one skilled in the art are intended to be included within the scope of the following claims.

Although these terms are used herein, such as body assembly 1, body 11, groove 11a, transverse axle 12, axle cover 13, handle 2, scroll 3, ratchet 4, teeth stop board 5, catch 6, sensor 7, signal processing circuit 8, circuit board 81, built-in power supply 82, configuration means 83, warning means 84, casing 9, seat 91, panel 92, display opening 92a, press frame 93, display 10, wireless signal transmission module 101 and exterior receiving means 102, the other similar terms could also be used. These terms are merely used to describe and explain the essence of the invention more conveniently, and any limitation to said terms is regarded as departing from the spirit of the invention.

LIST OF REFERENCE NUMERALS 1 body assembly
11 body
11a groove
12 transverse axle
13 axle cover
2 handle
3 scroll
4 ratchet
5 teeth stop board
6 catch
7 sensor
8 signal processing circuit
81 circuit board
82 built-in power supply
83 configuration means
84 warning means
9 casing
91 seat
92 panel
92a display opening
93 press frame
10 display
101 wireless signal transmission module
102 exterior receiving means

What is claimed is:

1. A force measuring ratchet tie down, comprising a body assembly (1), a handle (2), a teeth stop board (5), a catch (6) and a scroll (3), in which the handle (2) is connected with the body assembly (1) through the scroll (3), a binding belt having a fixable outer end is connected to the body assembly (1), another binding belt having a fixable outer end is rolled on the scroll (3), a ratchet (4) is fixed on the scroll (3), the body assembly (1) is movably connected with a teeth stop board (5) the end of which could be embedded among the teeth of the ratchet (4), and the handle (2) is movably connected with a catch (6) the end of which could be embedded among the teeth of the ratchet (4), characterized in that, a sensor (7) is placed at a forced part of the tie down, the sensor (7) is linked with a signal processing circuit (8) and could generate a signal corresponding to the size of the tensioning force of the binding belt when the tie down is in operation, and a display device is connected to the signal processing circuit (8).

2. The force measuring ratchet tie down as claimed in claim 1, characterized in that, the body assembly (1) has two parallel bodies (11) and a transverse axle (12), the scroll (3) is positioned through the bodies (11) at one end, the transverse axle (12) is fixed at the other end of the bodies (11), an axle cover (13) is set on the transverse axle (12), the axle cover (13) is linked with the binding belt having a fixable outer end, and the sensor (7) is kept on the body (11) or transverse axle (12) or axle cover (13).

3. The force measuring ratchet tie down as claimed in claim 2, characterized in that, the sensor (7) is a resistance strain gauge and fixed on the body (11), a casing (9) is held on said two bodies (11) outside the sensor (7), and the signal processing circuit (8) is set within the casing (9).

4. The force measuring ratchet tie down as claimed in claim 2, characterized in that, the body (11) has a groove (11a) on the outer wall, and the sensor (7) is secured in the groove (11a).

5. The force measuring ratchet tie down as claimed in claim 3, characterized in that, the display device comprises a display (10) connected with the signal processing circuit (8), and the display (10) is fixed to the casing (9).

6. The force measuring ratchet tie down as claimed in claim 3, characterized in that, the display device further includes a wireless signal transmission module (101) for transmitting a wireless signal and an exterior receiving means (102) for receiving said wireless signal connected to the signal processing circuit (8).

7. The force measuring ratchet tie down as claimed in claim 1, characterized in that, the signal processing circuit (8) includes a circuit board (81) which could receive and process the signal corresponding to the size of the tensioning force of the binding belt and a built-in power supply (82) connected with the circuit board (81) for supplying power to the entire signal processing circuit (8).

8. The force measuring ratchet tie down as claimed in claim 2, characterized in that, the signal processing circuit (8) includes a circuit board (81) which could receive and process the signal corresponding to the size of the tensioning force of the binding belt and a built-in power supply (82) connected with the circuit board (81) for supplying power to the entire signal processing circuit (8).

9. The force measuring ratchet tie down as claimed in claim 3, characterized in that, the signal processing circuit (8) includes a circuit board (81) which could receive and process the signal corresponding to the size of the tensioning force of the binding belt and a built-in power supply (82) connected with the circuit board (81) for supplying power to the entire signal processing circuit (8).

10. The force measuring ratchet tie down as claimed in claim 4, characterized in that, the signal processing circuit (8) includes a circuit board (81) which could receive and process the signal corresponding to the size of the tensioning force of the binding belt and a built-in power supply (82) connected with the circuit board (81) for supplying power to the entire signal processing circuit (8).

11. The force measuring ratchet tie down as claimed in claim 5, characterized in that, the signal processing circuit (8) includes a circuit board (81) which could receive and process the signal corresponding to the size of the tensioning force of the binding belt and a built-in power supply (82) connected with the circuit board (81) for supplying power to the entire signal processing circuit (8).

12. The force measuring ratchet tie down as claimed in claim 6, characterized in that, the signal processing circuit (8) includes a circuit board (81) which could receive and process the signal corresponding to the size of the tensioning force of the binding belt and a built-in power supply (82) connected with the circuit board (81) for supplying power to the entire signal processing circuit (8).

13. The force measuring ratchet tie down as claimed in claim 7, characterized in that, the circuit board (81) is linked with a configuration means (83) to set the threshold of the tensioning force and a warning means (84) to send a warning signal when the tensioning force exceeds the set threshold.

14. The force measuring ratchet tie down as claimed in claim 8, characterized in that, the circuit board (81) is linked with a configuration means (83) to set the threshold of the tensioning force and a warning means (84) to send a warning signal when the tensioning force exceeds the set threshold.

15. The force measuring ratchet tie down as claimed in claim 9, characterized in that, the circuit board (81) is linked with a configuration means (83) to set the threshold of the tensioning force and a warning means (84) to send a warning signal when the tensioning force exceeds the set threshold.

16. The force measuring ratchet tie down as claimed in claim 10, characterized in that, the circuit board (81) is linked with a configuration means (83) to set the threshold of the tensioning force and a warning means (84) to send a warning signal when the tensioning force exceeds the set threshold.

17. The force measuring ratchet tie down as claimed in claim 11, characterized in that, the circuit board (81) is linked with a configuration means (83) to set the threshold of the tensioning force and a warning means (84) to send a warning signal when the tensioning force exceeds the set threshold.

18. The force measuring ratchet tie down as claimed in claim 12, characterized in that, the circuit board (81) is linked with a configuration means (83) to set the threshold of the tensioning force and a warning means (84) to send a warning signal when the tensioning force exceeds the set threshold.

19. The force measuring ratchet tie down as claimed in claim 5, characterized in that, the casing (9) includes a seat (91) having a mounting groove and a panel (92) covering on the mounting groove, a display opening (92a) is provided on the panel (92), the display (10) is held in the display opening (92a), and the panel (92) is fixed on the seat (91) by a press frame (93).

20. The force measuring ratchet tie down as claimed in claim 13, characterized in that, the seat (91) is made of plastic and secured on the bodies (11) by injection molding.

* * * * *